Figure 1:
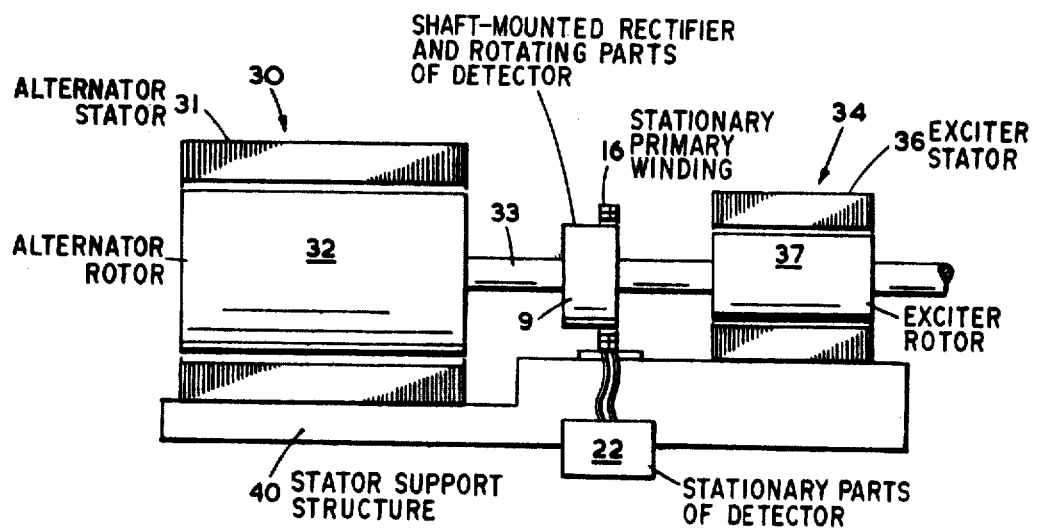

United States Patent

[11] 3,593,123

| [72] | Inventors | Alan Charles Williamson;<br>Leonard George Wardle, both of Stafford, England |
|---|---|---|
| [21] | Appl. No. | 807,550 |
| [22] | Filed | Mar. 17, 1969 |
| [45] | Patented | July 13, 1971 |
| [73] | Assignee | The English Electric Company Limited<br>London, England |
| [32] | Priority | Mar. 15, 1968 |
| [33] | | Great Britain |
| [31] | | 12636/68 |

[54] DYNAMO ELECTRIC MACHINES INCLUDING ROTOR WINDING EARTH FAULT DETECTOR
4 Claims, 2 Drawing Figs.

| [52] | U.S. Cl. | 324/51, 322/99 |
|---|---|---|
| [51] | Int. Cl. | G01r 31/02 |
| [50] | Field of Search | 324/51, 52, 54; 322/99 |

[56] References Cited

UNITED STATES PATENTS

| 2,640,100 | 5/1953 | Packer et al. | 324/51 |
|---|---|---|---|
| 2,844,794 | 7/1958 | Wright et al. | 324/51 X |
| 3,303,410 | 2/1967 | Hoover et al. | 324/51 X |

FOREIGN PATENTS

| 1,001,399 | 8/1965 | Great Britain | 310/68.4 |
|---|---|---|---|

Primary Examiner—Gerard R. Strecker
Attorneys—Misegades & Douglas, Keith Misegades and George R. Douglas, Jr.

ABSTRACT: A dynamo electric machine having a rotor with a field winding energized by a rotatable rectifier network is provided with a transformer the secondary winding of which rotates with the rotor and the primary winding is stationary. In conjunction with ancillary apparatus this enables a flow of fault current between the rotor winding and rotor body to be detected by consequent changes in an electrical quantity at the stationary primary winding.

DYNAMO ELECTRIC MACHINES INCLUDING ROTOR WINDING EARTH FAULT DETECTOR

This invention relates to dynamo electric machines of the kind in which the rotor has a direct current field winding energized by a rotating rectifier network.

Such machines which include synchronous alternating current generators, condensers and motors are usually described as having brushless excitation and as a result of these machines having no brushes, access to the rotating winding is not so easy as in the case of a machine having brushes. Such access to the rotating winding is required for monitoring and the detection of faults.

According to the invention there is provided a dynamo electric machine having a stator structure and a rotor structure, a direct current field winding ca d by the rotor structure, a rotatable rectifier network mounted on the rotor structure for energizing the rotor winding with direct current, and an earth fault detector for the rotor winding including:

a transformer having a primary winding and a secondary winding, the primary winding being mounted on the stator structure, the secondary winding being mounted on the rotor structure so as to be rotatable therewith, means for energizing the transformer primary winding with alternating current, a second rectifier mounted on the rotor structure, means for connecting the second rectifier to the rotor winding, the rotor structure, and to the transformer secondary winding so that, with the primary winding energized, a direct current voltage is impressed across the rotor winding and the rotor structure, and detector means for detecting a change in an electrical quantity at the said primary winding resulting from an earth fault between the rotor winding and the rotor structure which causes current to flow through the second rectifier and the transformer secondary winding.

In one preferred arrangement the transformer secondary winding is connected to the input terminals of a full-ware rectifier bridge the output terminals of which are respectively connected to the rotor winding and to the rotor body. A limiting resistor may be connected between the rectifier bridge and the rotor winding.

In another preferred arrangement the primary and secondary windings of the transformer are both tuned by capacitors so that the primary winding has a purely resistive impedance, whereby a change in the loading of the transformer primary winding may be detected as a change in the resistive impedance thereof.

In such arrangement the transformer primary winding and its associated capacitor may be connected as one arm of a bridge network.

Such bridge network preferably comprises the primary winding and capacitor in one arm, a second resistive arm and a pair of like reactive arms, the alternating current input to the transformer being applied across the junction of the primary winding arm with one reactive arm and the junction of the other reactive arm with the resistive arm, and including a detector device connected across the other two opposite diagonal junctions of the arm.

Figure 2:
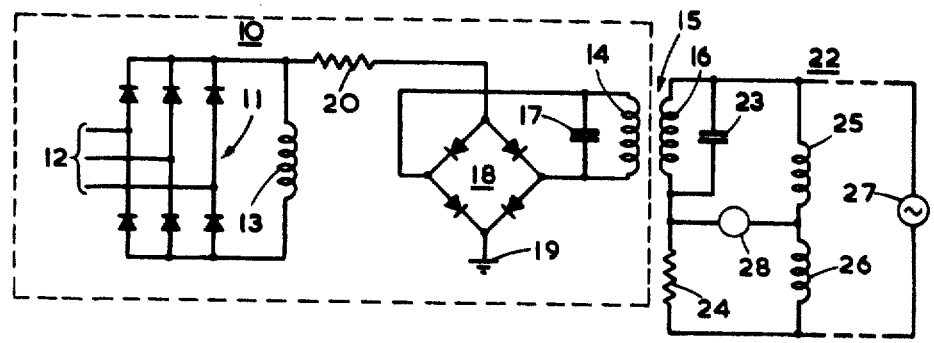

In order that the invention may be better understood, an arrangement of a brushless direct current generator arranged to supply the rotating field of a synchronous alternator, in accordance with the invention, will now be described, by way of example, with reference to the accompanying diagrammatic drawings, in which:

FIG. 1 is a diagrammatic representation of apparatus incorporating the invention: and FIG. 2 is a circuit diagram of an alternating current generator field fault detector applied to the apparatus of FIG. 1.

In FIG. 1 the reference 30 indicates a synchronous alternator having a stator 31 with a polyphase stator winding (not shown) and a rotor 32 having a rotor winding which is shown at 13 in FIG. 2. The alternator rotor 32 is driven by a shaft 33 which carries rectifier and other apparatus described in relation to FIG. 2, as well as the rotor of an exciter generator 34. The exciter generator has a stator 36 with stator windings (not shown) and a rotor 37 which has a three-phase armature winding (not shown).

In FIG. 2 the reference 10 generally indicates, within the chain dotted line, the rotating parts of the apparatus, certain parts of which are indicated by the reference 9 in FIG. 1. The reference 22 of FIG. 2 indicates those parts of the apparatus which are stationary and these are also indicated by the reference 22 of FIG. 1. As shown in FIG. 1, the parts indicated by the general reference 9 are mounted on the rotor shaft 33. This is the most convenient arrangement but the rotating parts 9 could be mounted on any part of the rotor structure comprising the two rotors 32 and 37 and the shaft 33.

The stationary parts 22 of FIG. 1 can be mounted near, or remote from, the two machines but the transformer primary winding 16 (FIGS. 1 and 2) must be mounted adjacent the transformer secondary winding 14 (FIG. 2) so that these two windings are electrically coupled. In FIG. 1 the secondary winding 16 is shown as mounted on a common stator support structure 40.

The apparatus 10 of FIG. 2 comprises a three-phase full-wave rectifier network 11 which is supplied by three lines 12 from the rotor of the three-phase alternating current exciter generator 34. The output of the rectifier network 11 is supplied to energize the field winding 13 of alternating current generator 30. Included to rotate with the field winding is shown the secondary winding 14 of a transformer 15. The winding 14 is shunted by a capacitor 17 and is connected to the input terminals of a full-wave rectifier bridge 18. The direct current output terminals of the bridge 18 are connected respectively to the body of the rotor 32, represented in FIG. 2 by an earth connection 19, and to the rotor winding 13 with a limiting resistor 20 between the bridge and the rotor winding.

The apparatus 22 of FIG. 2 includes the primary winding 16 of the transformer 15, this winding being shunted by a capacitor 23 which together are connected as one arm of a bridge having the other arms, 24 a resistive arm, and 25 and 26 two like inductive arms.

A high frequency alternating current supply of, for example, 500 kHz. for the bridge is shown at 27 and a detector device is provided across the bridge as shown at 28.

The capacitors 17 and 23 which are connected across the windings 14 and 16 of the transformer 15 are such that the transformer has a purely resistive impedance at its primary winding terminals.

Operation of the apparatus is as follows. The transformer 15 and rectifier bridge 18 provide a direct current output which is impressed between the rotor winding 13 and the rotor body earth connection 19 so that any short circuit between the winding 13 and the rotor body, or any breakdown in the insulation which causes it to have a low resistance causes current to flow in the circuit provided by the transformer primary winding 14 and the bridge network 18. Any such current flow is reflected as a reduction in the resistive impedance of the tuned transformer winding and this change in impedance is measured by means of the stationary detector device provided in the stationary bridge network.

The detector device 28 can be employed to provide a visual indication and/or to operate a suitable protective circuit as desired.

Preferably, the transformer windings 14 and 16 are concentric as shown in FIG. 1 but this is not necessary provided they are suitably coupled.

Any other form of detector for detecting changes at the primary winding terminals could be used.

While the invention has been described in relation to its use with an alternating current generator, it could also be used with a brushless synchronous motor or any other form of machine having a rotating direct current rectifier energized winding.

We claim:

1. A dynamo electric machine having a stator structure and a rotor structure, a direct current field winding carried by the rotor structure, a rotatable rectifier network mounted on the rotor structure for energizing the rotor winding with direct current, and an earth fault detector for the rotor winding including:
   a transformer having a primary winding and a secondary winding,
   the primary winding being mounted on the stator structure,
   the secondary winding being mounted on the rotor structure so as to be rotatable therewith,
   means for energizing the transformer primary winding with alternating current,
   a second rectifier mounted on the rotor structure,
   means for connecting the second rectifier to the rotor winding, the rotor structure, and to the transformer secondary winding so that, with the primary winding energized, a direct current voltage is impressed across the rotor winding and the rotor structure, and
   detector means for detecting a change in an electrical quantity at the said primary winding resulting from an earth fault between the rotor winding and the rotor structure which causes current to flow through the second rectifier and the transformer secondary winding.

2. A dynamo electric machine according to claim 1 including,
   a current-limiting resistor connected between the second rectifier and the rotor winding.

3. A dynamo electric machine according to claim 1 in which the detector means includes,
   a capacitor connected across the transformer primary winding, and
   a capacitor connected across the transformer secondary winding,
   these capacitors acting to tune the transformer windings so that the primary winding has a purely resistive impedance, and
   means for detecting a change in the resistive impedance of the said primary winding.

4. A dynamo electric machine according to claim 3 in which,
   the transformer primary winding and its associated capacitor are connected as one arm of a bridge network which comprises,
   the said primary winding and capacitor in one arm,
   a resistive arm,
   a pair of like reactive arms, and
   a detector device connected across the junction of the primary winding arm with the resistive arm and the junction of the pair of reactive arms,
   the alternating current input to the transformer being applied across the other two opposite diagonal junctions of the bridge arms.